(12) United States Patent
Mathai

(10) Patent No.: US 9,418,055 B2
(45) Date of Patent: Aug. 16, 2016

(54) METHOD FOR COPYING MULTIPLE CONTENT BETWEEN APPLICATIONS

(75) Inventor: Jackson Mathai, Heidelberg (DE)

(73) Assignee: SAP SE, Walldorf (DE)

( * ) Notice: Subject to any disclaimer, the term of this patent is extended or adjusted under 35 U.S.C. 154(b) by 498 days.

(21) Appl. No.: 13/479,822

(22) Filed: May 24, 2012

(65) Prior Publication Data

US 2013/0318425 A1    Nov. 28, 2013

(51) Int. Cl.
*G06F 17/00* (2006.01)
*G06F 17/24* (2006.01)

(52) U.S. Cl.
CPC .................................. *G06F 17/243* (2013.01)

(58) Field of Classification Search
CPC ....................................................... G03G 19/00
USPC .......................... 715/221, 200, 223, 224, 226
See application file for complete search history.

(56) References Cited

U.S. PATENT DOCUMENTS

| | | | | |
|---|---|---|---|---|
| 6,499,041 | B1 * | 12/2002 | Breslau et al. | 715/210 |
| 7,908,564 | B2 * | 3/2011 | Hara et al. | 715/770 |
| 8,635,518 | B1 * | 1/2014 | Bhanoo | 715/205 |
| 2004/0223648 | A1 * | 11/2004 | Hoene | G06F 17/2211 382/218 |
| 2007/0198910 | A1 * | 8/2007 | Jensen | G06F 17/243 715/234 |
| 2014/0278457 | A1 * | 9/2014 | Weiler | G06Q 50/22 705/2 |

* cited by examiner

*Primary Examiner* — Manglesh M Patel
(74) *Attorney, Agent, or Firm* — Jones Day

(57) ABSTRACT

A method for copying content from a first form to a second form may include selecting a plurality of fields in the first form. At least one of the plurality of fields in the first form may include the content to be copied. The method may include determining mapping between the selected fields and corresponding field labels in the first form. The method may include writing the content in the selected fields to corresponding fields in the second form.

21 Claims, 5 Drawing Sheets

METHOD FOR COPYING MULTIPLE CONTENT BETWEEN APPLICATIONS

BACKGROUND

Copy and paste functions are desirable because they allow a user to quickly transfer information between multiple documents or applications. Content from a first application can be copied to a second application by selecting content to be copied in the first application and selecting the place in the second application to paste the copied content. When content to be copied is provided in different sections of the first application, the user must select individually each of the content to be copied. Similarly, if the content is to be copied to different sections of the second application the user must select the sections individually to which the selected content should be copied. The conventional copy and paste functions consume considerable time because the user is required to make each selection, switch between the applications and select the place to paste the selected text for each section to be copied.

Examples, may include copying multiple fields from a first form to multiple fields of a second form, one field at a time. Even if multiple fields of a form are selected in a single operation, the user must still provide sections of the second form where the content should to be copied. In addition, although the selected content in the fields may need to be copied to different sections of the second form (e.g., fields in a form are arranged differently), conventional paste functions will paste the entire selected content in the place determined by the user. Thus, no consideration is made as to where the different portions of the selected content should be pasted in the second form.

BRIEF DESCRIPTION OF THE DRAWINGS

FIG. 4 illustrates a form including multiple content that is selected by selecting fields and field labels in a portion of the form.

FIG. 5 illustrates a form that may include fields with content generated using multiple selected fields with mapping.

DETAILED DESCRIPTION

The present disclosure relates to an improved method to perform copying operations and in particular to an improved method to perform copying of multiple content between multiple applications.

A method for copying content from a first form to a second form may include selecting a plurality of fields in the first form. At least one of the plurality of fields in the first form may include the content to be copied. The method may include determining mapping between the selected fields and corresponding field labels in the first form. The method may include writing the content in the selected fields to corresponding fields in the second form. In another embodiment, the content in the selected fields may be written to corresponding cells in a table.

In another embodiment, a method for copying content from a table to a form may include selecting a plurality of cells in the table. At least one of the plurality of cells in the table may include the content to be copied. The method may include determining mapping between the selected cells and corresponding cell labels in the table. The method may include writing the content in the selected cells to corresponding fields in the form.

Figures 1, 2:
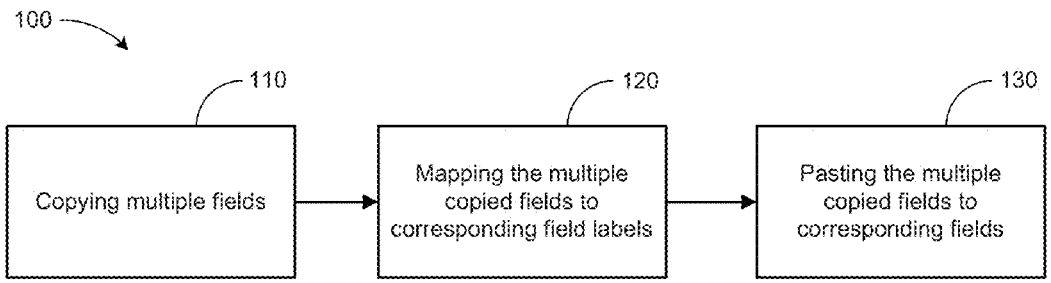
FIG. 1 illustrates a method for copying multiple fields from one application to another application.
FIG. 2 illustrates a form including multiple fields with content that is selected.

FIG. 1 illustrates a method 100 for copying multiple fields from one application to another application. The method may be executed by a processing device. The method may include copying multiple fields in step 110, mapping the multiple copied fields to corresponding field labels in step 120, and pasting the multiple copied fields to corresponding fields in step 130.

Copying multiple fields in step 110 may include selecting multiple fields in an application. The application may be a form that includes multiple fields displayed in the form. The application may include multiple forms. The fields may include content of one or more of characters, symbols and images. Selection of the fields may select the content in the field. The form may be part of an application. The application may be a program executed by a computer or a portable device. The forms may be displayed on a computer or portable device via a wireless network or the internet. The content in the selected fields may be stored in a memory of computer or portable device that is running the application or an external storage place.

The fields may be editable fields or non-editable fields. The editable fields may allow a user to enter new content, select content from available options, or change the content entered in the field. The editable fields may include pull down menus, a quick view calendar, or an external application that allows one or more selections to be made to define the content for the field. The non-editable fields may have content that does not need to be changed by a user. The content in the non-editable fields may be obtained from databases, from other forms or tables, or from previously entered data that does not need to be updates.

The field labels may be displayed next to the fields. The field labels may describe the type of content displayed in the fields. The field labels may be displayed near the field having the content. The form may include fields that do not have field labels displayed next to them. If a field does not have a field label displayed next to the field, the field may still have a field label associated with the field.

A selection of the fields in a form may be made by a user selecting portions of the form that include the content to be copied. For example, a user may draw a box selecting a portion of the form that includes the content that should be copied. The user may select multiple portions of the form having the content to be copied. The multiple portions of a form may be portions from different forms, if multiple forms are available. A user may also individually select each of the fields to be copied by clicking in a predefined area of the field or the field label, while a selection function is activated. All of the data displayed on the from may also be selected by a global selection command. The selection may include editable and non-editable fields and cells. The selection of the multiple field may be performed approximately simultaneously.

A toolbar may be included to provide one or more selection options to a user. The toolbar may include an option to activate a selection, an option to draw a box on the form, an option to draw the bounds of an area or window to be selected, an option to activate selection of multiple portions of the form, or an option for individual selection of fields or field labels. The selection of the content may also be activated by keyboard shortcuts.

Once a selection is made, mapping may be performed between the fields and the field labels, in step 120. The mapping may be performed after the selection is made or after a command is entered to copy the selected portion of the form. For example, after the selection is made a user may activate the copy operation by entering (ctrl+c) on an input device, such as a keyboard.

The mapping between the fields and the field labels may be performed in a backend processing device. The mapping may be performed by looking at the code of the form to determine the correspondence between the fields and the field labels. The locations of the field labels and fields with content may be considered in determining the mapping. The results of the mapping may be stored in a temporary location, such as a hard drive on a system or an external storage medium, until the content is copied to a new form.

The content of the selected multiple fields from the form may be pasted in new fields that correspond to the fields of the selected multiple fields, in step 130. The pasting may include writing the content in the new form. Thus, multiple content from one form may be provided to corresponding fields in one or more new forms. The new form may be in the same application or a different application. Providing the multiple content in a new form may include determining fields in the new form that correspond to the fields with content in the original form. The mapping of the content to the field labels, may be used to fill in the fields that correspond to the fields with content from the original form.

The steps shown in FIG. 1, can be used to provide a user with an easy method to copy multiple fields from one form to one or more other forms. The method to copy and paste multiple fields, discussed above with reference to multiple forms, may also be performed between a form and a table having multiple cells. That is, the content in fields on a form can be copied to cells in a table or the content in cells can be copied to fields in a form. The content in the fields copied to a table may be displayed in multiple cells of a table. For example, the content may be displayed in an Excel® spreadsheet. The content in cells of a table can also be copied to the corresponding fields in the form.

The content in the table may be displayed using one or more rows and one or more columns. Each row or column may represent a certain type of content. Each row or column may include a label for the row or column. The cells of the table may include editable cells, non-editable cells, and cells that a user can select content with one or more options.

Once the fields in a form are selected and a mapping is performed between the field and the field label, the content of the selected fields may be provided to a table. The table may display the selected content in the cells of the table. The content may be displayed in cells that have labels corresponding to the mapping of the content to the field labels. In the table, the first cell of each row may include the label of the cells in each row. Alternatively, the first cell of each column may include the label of the cells in each column. Other arrangements between the content in the cells and the cell labels may be used to display the multiple content.

To provide the content from the cells of a table, the cells in the table may first be selected. The selection of the cells in a table may be selected by defining a portion of the table having cells to be copied, selecting multiple portions of the table, selecting multiple cells individually or by selecting one or more rows or columns. The table mapping between the content in the cells and the labels of the cells may determined by looking at the code of the table to determine the correspondence between the content in the cell and the cell label, by finding labels near the cells to be copied or by considering the label of each row or column. The table mapping may also be performed by considering any other predefined arrangement between the cells in the table and the cell labels.

The content selected in a table may be provided to one or more forms having fields with corresponding labels. The mapping between the cells and the cell labels may be used to provide content in the fields of the form that have corresponding labels.

FIG. 2 illustrates a form 200 including multiple fields with content that are selected. The form 200 may include selection box 202 defining a portion of the form to be copied. As shown in FIG. 2, the selection may include selecting editable fields 204, non-editable fields 206, field labels 208, and section labels 210. The section label 210 may be provided as a top level label for the multiple fields. The section labels may be included in the mapping performed in step 120 of FIG. 1.

Figure 3:
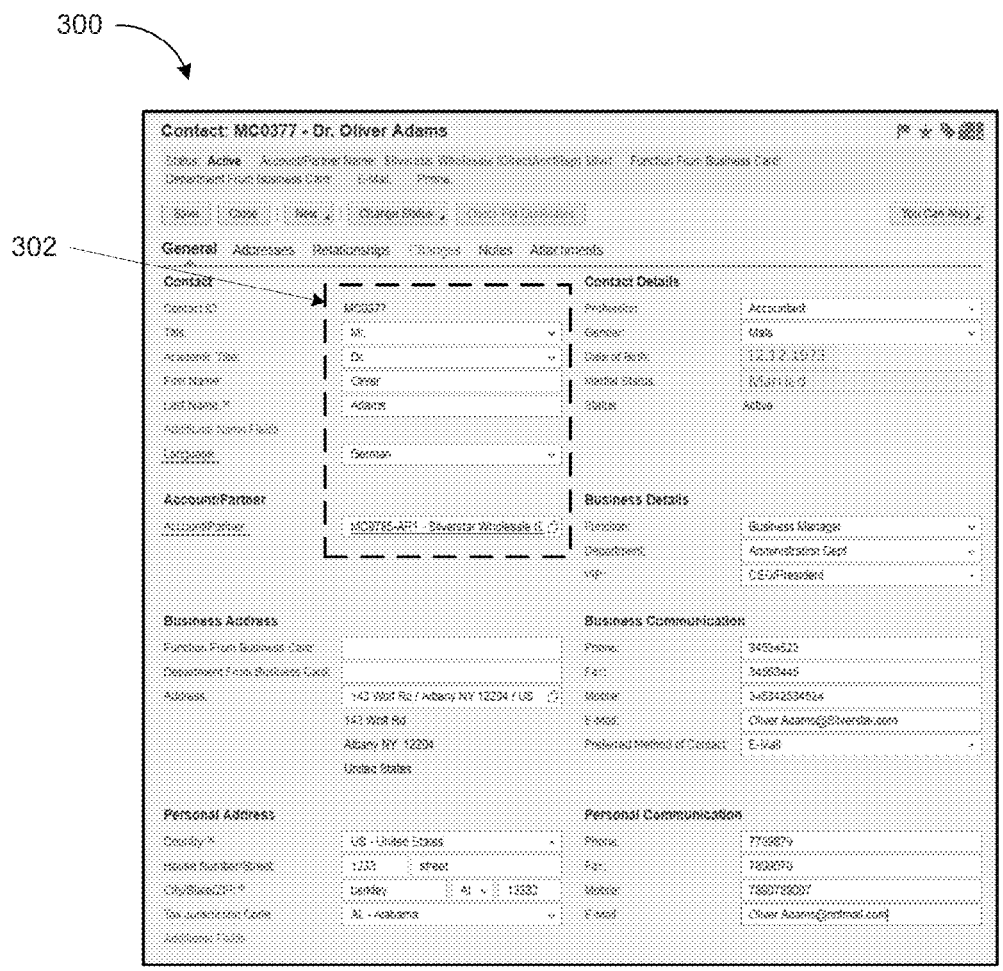
FIG. 3 illustrates a form including multiple content that is selected by selecting fields in a portion of the form.

FIG. 3 illustrates a form 300 including multiple content that are selected by selecting fields in a portion of the form. The portion of the form 300 may be selected by selection box 302. As shown in FIG. 3, selection box 302 includes only a portion of the form. Fields that are within the selection box 302 may be selected and mapping may be performed for the selected fields. The partial selection of the fields to be copied may include selecting fields and performing mapping for the fields that are only within the selection box 302. The partial selection may select fields which are completely within the selection box 302 or may include selection of fields which are at least partially within the selection box 302. Mapping of the selected fields to the field labels can be performed for the fields that are selected even though the field labels are not selected (e.g., field labels are not within selection box 302).

Figures 4, 5:
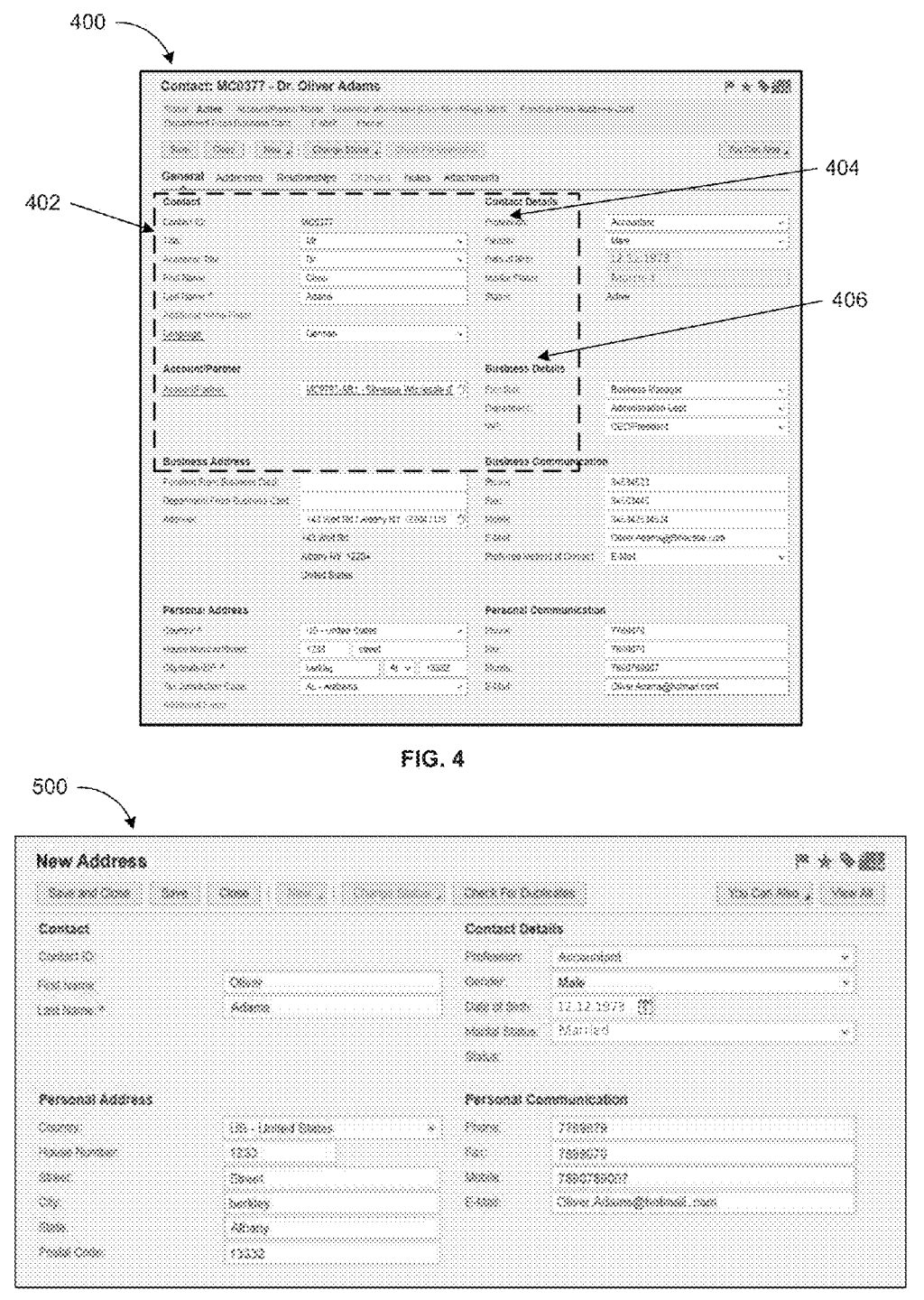

FIG. 4 illustrates a form 400 including multiple content that are selected by selecting fields and field labels a portion of the form 400. The portion of the form 400 may be selected by selection box 402. As shown in FIG. 4, selection box 402 includes only a portion of the form. Fields that are within the selection box 402 may be selected and mapping may be performed for the selected fields. With a partial selection of the form a selection of the fields may include selection of fields that are within the selection box 402. Thus a selection of a field may be made although a corresponding field label is not within the selection box 402.

Alternatively, the selection of fields can be made if the label of the field is selected. Thus, a field label that is within the selection box 402 may be selected together with the content in the field corresponding to the selected field label although the field is not within the selection box 402. For example, if "Profession" label 404 is within selection box 402 in FIG. 4, content "Accountant" in the field corresponding to field label 404 may be selected.

Alternatively, the selection of fields can be made if only the label of a section label 406 is selected. Thus, the section label 406 that is within the selection box 402 may be selected together with the fields and content in the fields associated with the section label 406. For example, if "Business Details" section label 406 is within selection box 402 in FIG. 4, all of the fields under the "Business Address" section label 404 section label may be selected together with the content in the fields (e.g., "Function" field, "Department" field and "VIP" field).

FIG. 5 illustrates a form 500 that may include fields with content generated using multiple selected fields with mapping. The content selected, for example in the form 200 (illustrated in FIG. 2), may be provided in the form 500. Because the form 500 includes fields with content that correspond to the selected fields in form 200, the fields in form 500 can be filled in with the corresponding content from form 200. Because form 500 does not include all of the fields included in the selection of form 200, only fields with corresponding content can be copied into form 500. In addition, because the content is provided in the new form based on the mapping, the order of the fields in the form 500 does not have to match the order of the field in the form 200. Extra fields that were selected in the form 200 and were not included in the form 500 because the form 500 did not include corresponding field labels may be disregarded, may be stored in a separate location (e.g., a log file or a table) or may be copied to another form or table having corresponding fields.

Figure 6:
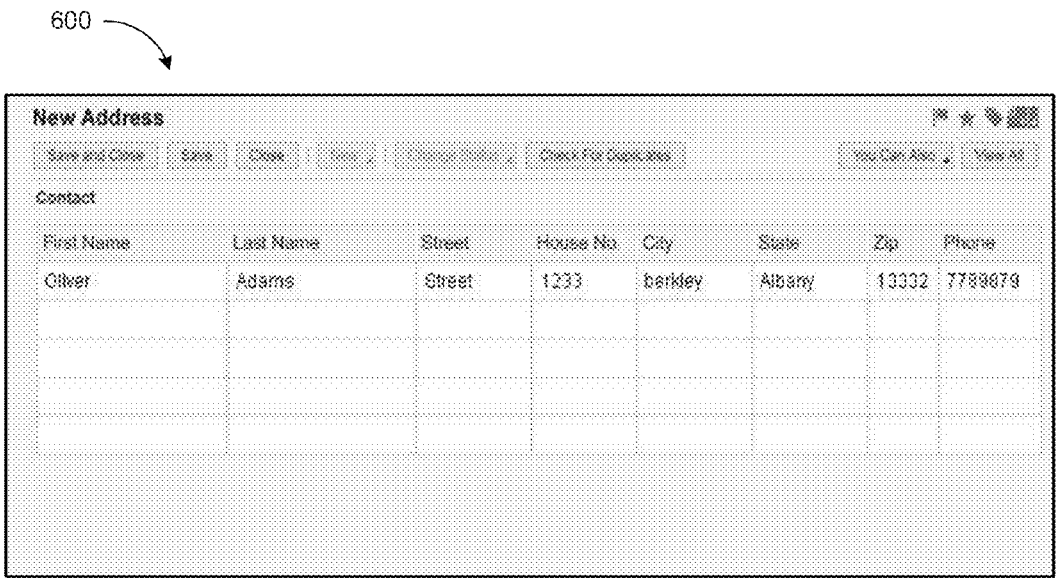
FIG. 6 illustrates a table that can include content generated using multiple selected content with mapping.

FIG. 6 illustrates a table 600 that can include content generated using multiple selected content with mapping. The content selected, for example in the form 200 (illustrated in FIG. 2), may be provided in the table 600. The content in the table 600 may be provided in cells with labels that correspond to the selected field in the form 200. Thus, the content of one field can be provided in a single cell of the table. Because the table 500 does not include all of the fields included in the selection of the form 200, only content with corresponding cell labels in the table 600 are copied. Extra fields that were selected in the form 200 and were not included in the table 600 because the table 600 did not include corresponding cell labels may be disregarded, may be stored in a separate location (e.g., log file or separate cells) or may be copied to another form or table having corresponding fields.

In another embodiment, the content and field labels corresponding to the selected fields can be copied to a table that does not include cell labels. The field labels corresponding to the selected fields can be generated in cells of a row or column of the table. The content can be provided below or next to the cells having the corresponding labels. In addition to including the field labels, section labels 210 (shown in FIG. 2) may be generated in the table.

Figure 7:
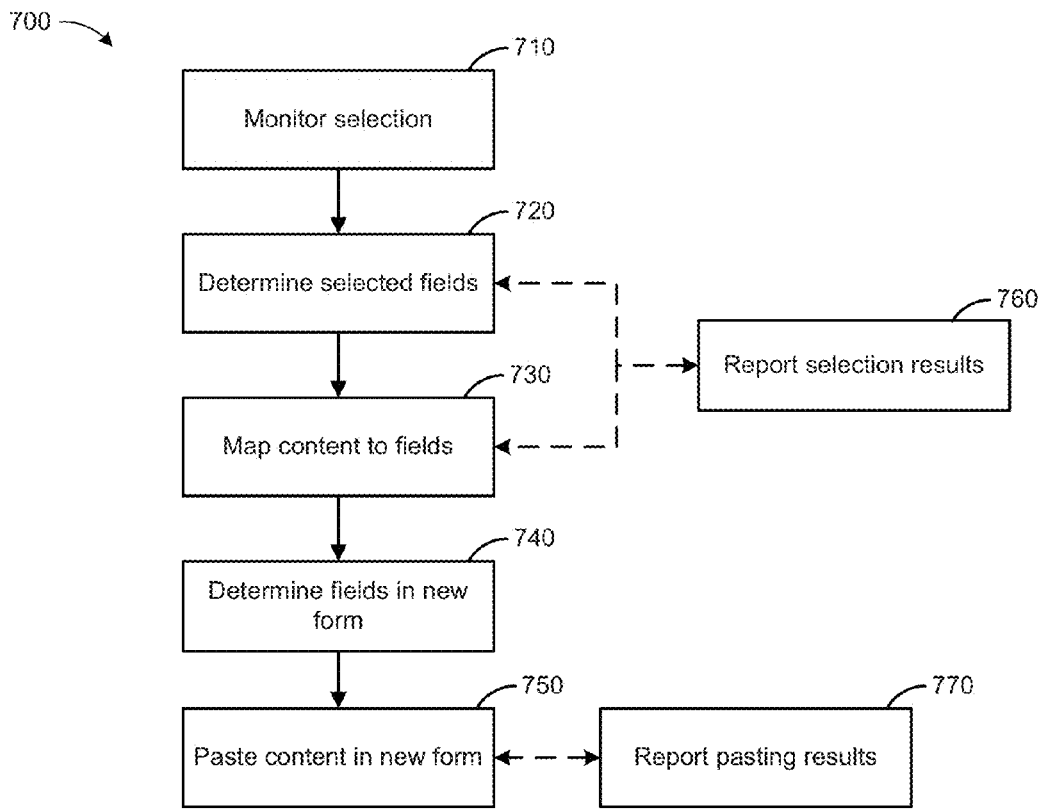
FIG. 7 illustrates a method for copying multiple content from one application to another application with notifications.

FIG. 7 illustrates a method 700 for copying multiple content from one application to another application with notifications. The method may include monitoring selection in step 710, determining selected fields in step 720, mapping the content to fields in step 730, determining fields in new form or table in step 740, and pasting selected content in a new form or table in step 750. The method 700 may include optional steps of reporting the selection and/or pasting of the method. In step 760 a report of the selection may be provided and in step 770 a report of the pasting may be provided.

In step 710, monitoring a selection of the form may be performed. The monitoring may include determining the area of the form that a user defines as the selected portion. In step 720, a determination may be made as to which fields within the selected portion of the form are selected. In this step, fields that are editable or non-editable may be included or excluded from the selection based on selection settings. Selection settings may be defined before a selection is made or may be made after a portion of the form to be selected is defined.

In step 730, a mapping may be performed between the fields that are selected and the field labels. Before the content of the selected fields is provided in a new form, a determination may be made to determine the fields that are included in the new form in step 740. The content of the selected fields may be pasted in the corresponding fields of the new form in step 750. The pasting may be performed based on the mapping performed in step 730, between the selected fields and the field labels.

Step 760 to report the selection of fields may be provided after the determination as to which fields are within the selected portion in step 720 or after the mapping in step 730. The reporting may include a notification as to how much and what kind of data was selected. The reporting may include providing a notification of the number of editable fields selected, the number of non-editable fields selected, the number of fields not selected, the number of fields selected without corresponding labels, and the number of fields selected without content. The reporting may be provided to a user making the selection or can be stored in a log file. An option may be provided to the user with the report to continue displaying the reporting after each selection or to not display the reporting after the next selection.

Step 770 to report the pasting may be provide to report the success or failure of the pasting operation. The report may include the number of fields copied, the number of editable fields copied, the number of non-editable fields copied, the number of fields not pasted because of missing fields in the new form, the content and labels that were not pasted, or fields that are missing content in the new form after the copying. The reporting can be set to report only when data is missing or when all of the content was not provided to the new form or table. The reporting may be provided to a user making the selection or can be stored in a log file. An option may be provided to the user with the report to continue displaying the reporting after each pasting operation or to not display the reporting after the next parting operation.

The method illustrated in FIG. 7 may also be performed for selecting content in a form and copying the content to a table, or selecting content in a table and copying the content to a form.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 8:
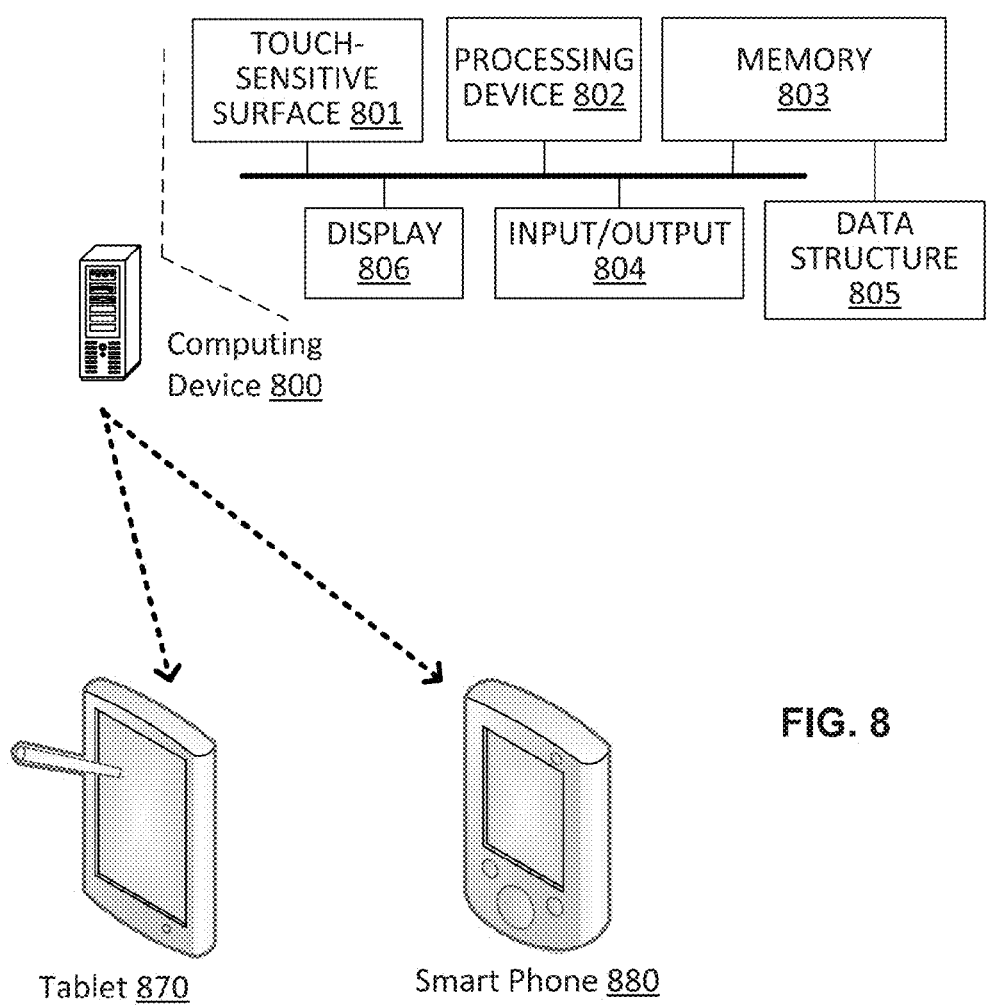
FIG. 8 illustrates an exemplary architecture of a computing device.

FIG. 8 illustrates an exemplary architecture of a computing device 800. A computing device 800 may include a touch-sensitive surface 801, a processing device 802, a memory 803 storing structured data 805, an input/output device 804, and a display 806. Each of these components 801 to 806 may be interconnected via a system bus.

The display 806 may be used to display the applications that include forms or tables. In some instances, a surface of the display 806 may be the touch-sensitive surface 801, though in other instances the two may be separate. The touch-sensitive surface 801 may be used to select the fields or cells to be copied. Additionally, in some instances the computing device 800 may be a tablet 870, smart phone 880, or other type of portable computing device, though the computing device 800 need not be portable.

Communications input/output device 804 may enable connectivity between the computing device 800 and other computing systems, peripherals, and devices by encoding and/or transmitting data to be sent to the external devices and receiving and/or decoding data received from the external devices.

In an embodiment, memory 803 may contain different components for retrieving, presenting, changing, and saving data. Memory 803 may include a variety of memory devices, for example, Dynamic Random Access Memory (DRAM), Static RAM (SRAM), flash memory, cache memory, and other memory devices.

Processing device 802 may perform computation and control functions of a system and comprises a suitable central processing unit (CPU). Processing device 802 may include a single integrated circuit, such as a microprocessing device, or may include any suitable number of integrated circuit devices and/or circuit boards working in cooperation to accomplish the functions of a processing device. Processing device 802 may execute computer programs, such as object-oriented computer programs, within memory 803.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software or hardware, but some systems and methods consistent with the present invention may be implemented in both software and hardware.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

I claim:

1. A method for copying content from a first form to a second form, the method being implemented by one or more data processors forming part of at least one computing system and comprising:

receiving, at a client computing device and via a graphical user interface displaying the first form, a selection of a plurality of fields in the first form, at least one of the plurality of fields including the content to be copied, the plurality of fields being selected by defining an area in the first form that includes the fields to be copied, the area being defined by drawing a box via the graphical user interface;

transmitting, by the client computing device to a remote backend system, data comprising the selection of the plurality of fields in the first form;

determining, by the remote backend system, mapping between the selected fields and corresponding field labels in the first form as a function of a location of at least one selected field and a location of at least one corresponding field label;

writing, at the client computing device, the content in the selected fields to fields in the second form that correspond to the corresponding field labels based on the determined mapping; and generating, at the client computing device, a report based on the selecting the fields in the first form and the writing of the content in the selected fields to the second form, wherein the report includes a number of fields not selected.

2. The method of claim 1, wherein the selecting of the plurality of fields includes selecting, via the graphical user interface, at least one non-editable field.

3. The method of claim 1, wherein the selecting of the plurality of fields includes defining the area around at least one field without including a corresponding field label.

4. The method of claim 3, wherein the mapping is performed between the at least one field selected without the corresponding field label and the corresponding field label.

5. The method of claim 1, wherein the selecting of the plurality of fields includes defining the area around at least one field label without including a corresponding field.

6. The method of claim 5, wherein mapping is performed between the at least one field label selected without the corresponding field and the corresponding field.

7. The method of claim 1, further comprising: storing the report of at least one of the selecting the fields in the first form and the writing of the content in the selected fields to the second form in a log file.

8. The method of claim 1, wherein the report of the selecting the fields in the first form further includes at least one of (i) a number of editable fields selected via the graphical user interface, (ii) a number of non-editable fields selected via the graphical user interface, (iii) a number of fields selected without corresponding labels and (iv) a number of fields without content selected, wherein the report of the writing of the content in the selected fields to the second form includes at least one of (i) a number of fields copied, (ii) a number of editable fields copied, (iii) a number of non-editable fields copied, (iv) a number of fields not pasted because of missing fields in the second form, (v) the content in the fields and the corresponding field labels that were not pasted, and (vi) the fields that are missing content in the second form after copying.

9. The method of claim 1, wherein the selected plurality of fields are from different portions of the first form.

10. The method of claim 1, wherein the selected plurality of fields are from the first form and additionally from a third form different from the second form.

11. A method for copying content from a form to a table, the method being implemented by one or more data processors forming part of at least one computing device and comprising:

receiving, by at least one data processor and via a graphical user interface displaying the form, user-generated input selecting a plurality of fields in the form, at least one of the plurality of fields including the content to be copied, the plurality of fields being selected by defining an area in the form that includes the fields to be copied, the area being defined by drawing a box via the graphical user interface;

determining, by at least one data processor looking at the code of the form, mapping between the selected fields and corresponding field labels in the form as a function of a location of at least one selected field and a location of at least one corresponding field label;

writing, by at least one data processor, the content in the selected fields to cells in the table that correspond to the corresponding field labels based on the determined mapping; and generating, by at least one data processor, a report based on the selecting the fields in the form and the writing of the content in the selected fields to the table, wherein the report includes a number of fields not selected.

12. The method of claim 11, wherein the selecting of the plurality of fields includes selecting, via the graphical user interface, at least one non-editable field.

13. The method of claim 11, wherein the selecting of the plurality of fields includes defining the area around at least one field without including a corresponding field label.

14. The method of claim 13, wherein mapping is performed between the at least one field selected without the corresponding field label and the corresponding field label.

15. The method of claim 11, wherein the selecting of the plurality of fields includes defining the area around at least one field label without including a corresponding field.

16. The method of claim 15, wherein mapping is performed between the at least one field label selected without the corresponding field and the corresponding field.

17. The method of claim 11, further comprising: storing, by at least one data processor, the report of at least one of the selecting the fields in the form and the writing of the content in the selected fields to the table in a log file.

18. A method for copying content from a table to a form, the method being implemented by one or more data processors forming part of at least one computing device and comprising:

receiving, by at least one data processor via a graphical user interface displaying the table, user-generated input selecting a plurality of cells in the table, at least one of the plurality of cells including the content to be copied, the plurality of cells being selected by defining an area in the table that includes the fields to be copied, the area being defined by drawing a box via the graphical user interface;

determining, by at least one data processor, mapping between the selected cells and corresponding cell labels in the table as a function of at least one label of a row of the table and at least one label of a column of the table;

writing, by at least one data processor, the content in the selected cells to fields in the form that correspond to the corresponding cell label based on the determined mapping; and generating, by at least one data processor, a report based on the selecting the cells in the table and the writing of the content in the selected cell to the form, wherein the report includes a number of cells not selected.

19. The method of claim 18, further comprising: storing, by at least one data processor, the report of at least one of the selecting the cells in the table and the writing of the content in the selected cells to the form in a log file.

20. A non-transitory computer readable medium storing a program causing a computer to execute a process to copy content from a first form to a second form, the process comprising:

determining based on a selection by a user, via a graphical user interface displaying the first form, of a plurality of fields in the first form which fields are to be copied, at least one of the plurality of fields including the content to be copied, the plurality of fields being selected by defining an area in the first form that includes the fields to be copied, the area being defined by drawing a box via the graphical user interface;

determining mapping between the selected fields and corresponding field labels in the first form as a function of a location of at least one selected field and a location of at least one corresponding field label;

writing the content in the selected fields to fields in the second form that correspond to the corresponding field labels based on the determined mapping; and generating a report based on the selecting the fields in the first form and the writing of the content in the selected fields to the second form, wherein the report includes a number of fields not selected.

21. An apparatus for displaying a first form and a second form, comprising:

a processing unit; and a display screen operatively connected to the processing unit and operative to display the first form and the second form, the first form including content to be copied to a second form, wherein the processing unit is operative to;

provide a user with an option to select, via a graphical user interface displayed in the display screen, a plurality of fields in the first form, at least one of the plurality of fields including the content to be copied, the plurality of fields being selected by defining an area in the first form that includes the fields to be copied, the area being defined by drawing a box via the graphical user interface;

determine mapping between the selected fields and corresponding field labels in the first form as a function of a location of at least one selected field and a location of at least one corresponding field label;

writing the content in the selected fields to fields in the second form that correspond to the corresponding field labels based on the determined mapping; and generating a report based on the fields in the first form and the writing of the content in the selected fields to the second form, wherein the report includes a number of fields not selected.

* * * * *